United States Patent
Lee et al.

(10) Patent No.: US 8,019,277 B2
(45) Date of Patent: Sep. 13, 2011

(54) SYSTEM AND METHOD FOR PLAYING AUDIO FILE ACCORDING TO RECEIVED LOCATION INFORMATION

(75) Inventors: Eun-jung Lee, Suwon-si (KR);
Young-wan Seo, Suwon-si (KR); In-sik Myung, Incheon (KR); KiranPal Sagoo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1053 days.

(21) Appl. No.: 11/838,325

(22) Filed: Aug. 14, 2007

(65) Prior Publication Data

US 2008/0207115 A1 Aug. 28, 2008

(30) Foreign Application Priority Data

Jan. 23, 2007 (KR) .................. 10-2007-0006918

(51) Int. Cl.
*H04Q 7/20* (2006.01)
(52) U.S. Cl. .................. 455/3.06; 455/456.1
(58) Field of Classification Search .............. 455/3.6, 455/456.1, 456.6, 517, 41.2, 550.1, 566, 455/466
See application file for complete search history.

(56) References Cited

U.S. PATENT DOCUMENTS

| 2005/0210120 | A1* | 9/2005 | Yukie et al. ............ 709/217 |
| 2006/0037420 | A1* | 2/2006 | Mast et al. ............ 74/89.14 |
| 2006/0062242 | A1 | 3/2006 | Dacosta |
| 2007/0282905 | A1* | 12/2007 | Karlberg ............ 707/104.1 |
| 2008/0194268 | A1* | 8/2008 | Koch ............ 455/456.1 |

FOREIGN PATENT DOCUMENTS

| KR | 2005-112379 | 11/2005 |
| KR | 2006-40471 | 5/2006 |
| WO | WO 2004/075169 | 9/2004 |

* cited by examiner

*Primary Examiner* — CongVan Tran
(74) *Attorney, Agent, or Firm* — North Star Intellectual Property Law, PC (57) ABSTRACT

A system and method for playing an audio file, and for providing a user with information on the other party's location by playing an audio file are disclosed. The system is provided with a first audio player and a second audio player, and each audio player is provided with a transceiver unit to receive a message regarding sharing of an audio file and location information transmitted from the other audio player; a location-sensing unit to sense relative location of the two audio players, i.e., the first audio player and the second audio player, based on received location information; a wireless communication unit to receive the audio file transmitted from the other audio player; and a play-management unit for playing the audio file if the sensed relative location is within a short distance.

27 Claims, 5 Drawing Sheets

SYSTEM AND METHOD FOR PLAYING AUDIO FILE ACCORDING TO RECEIVED LOCATION INFORMATION

CROSS-REFERENCE TO RELATED APPLICATION

This application claims all benefits accruing under 35 U.S.C. §119 from Korean Patent Application No. 2007-6918 filed on Jan. 23, 2007 in the Korean Intellectual Property Office, the disclosure of which is incorporated herein by reference.

BACKGROUND OF THE INVENTION

1. Field of the Invention

The present invention relates to a system and method for playing an audio file, and more particularly, to a system and method for providing a user with information of another party's location by playing an audio file.

2. Related Art

Generally, a portable audio player (e.g., an MP3 player) uses a technology for compressing audio by 50 times, and producing sound quality similar to that of conventional audio CDs. MP3 players playing music files compressed in such a manner have become widespread. Also, as the size and weight of the portable audio players become smaller and lighter in order to respond to consumer demands, manufacturers are competing with one another to provide more diverse functions.

The conventional MP3 player includes a storage means for storing MP3 files, and a MP3 decoder for decompressing the MP3 file stored in the storage means and then converting the decompressed MP3 file into an audio file. Further, the MP3 player can also exchange data with another device, such as, for example, a host computer, via predetermined cables (e.g., a USB communication port).

Korean Unexamined Patent Publication No. 2006-040471 discloses an MP3 player having a transceiver function capable of transmitting embedded files to other peripheral MP3 players (i.e., an MP3 file player, hereinafter, referred to as "MP3 player"), and enabling file reproduction to be simultaneously started by exchanging operation signals, and then conducting a payment function. However, such a MP3 player does not have technology for providing a user with information on another party's location by playing an audio file.

SUMMARY OF THE INVENTION

Several aspects and example embodiments of the present invention provide a system and method for providing a user with information on another party's location by playing an audio file.

Additional aspects and/or advantages of the invention will be set forth in part in the description which follows and, in part, will be obvious from the description, or may be learned by practice of the invention.

In accordance with an example embodiment of the present invention, there is provided system having two mobile devices (i.e., a first audio player and a second audio player) connected via a network, for playing an audio file based on received location information. Each mobile device comprises a transceiver unit, to receive a response message about share of the audio file and location information transmitted from the other mobile device (i.e., the second audio player); a location-sensing unit to sense the relative location of the two mobile devices (i.e., the first audio player and the second audio player) based on the received location information; a wireless communication unit arranged to receive the audio file transmitted from the other mobile device (i.e., the second audio player), and a play-management unit for playing the received audio file if the sensed relative location is within a short distance.

According to an aspect of the present invention, the location-sensing unit is used to sense the moving direction of the other mobile device based on the received location information.

According to another aspect of the present invention, the play-management unit is further used to control the volume of the audio file played, when the received audio file is played.

According to another aspect of the present invention, the play-management unit is also used to output the audio file based on the moving direction of the other mobile device, to control the volume of the audio file based on the sensed relative location of the other mobile device, to play a predetermined sound audio, if the sensed relative location of the other mobile device is within outside a certain distance, and to terminate the currently played audio file, if the sensed relative location of the other mobile device is within a certain distance.

In accordance with another example embodiment of the present invention, there is provided a method of playing an audio file according to received location information, between a first audio player and a second audio player. Such a method comprises transmitting, at the first audio player, a response message about share of the audio file and a message for requesting location information to the second audio player; sensing the relative location between the first audio player and the second audio player based on the received location information according to the request; receiving, at the first audio player, the audio file from the second audio player if the sensed location is within a short distance, and playing the received audio file at the first audio player.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
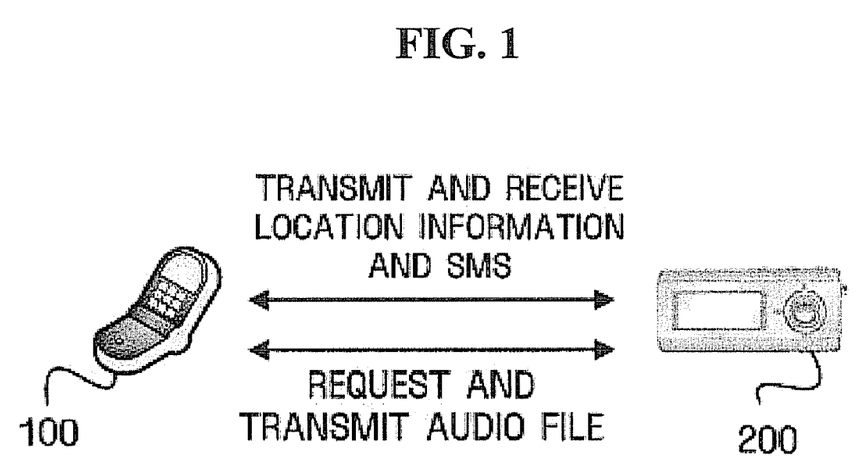
FIG. 1 illustrates a system for playing an audio file based on received location information according to an example embodiment of the present invention.

FIG. 1 illustrates an example system for playing an audio file based on received location information according to an embodiment of the present invention. As illustrated in FIG. 1, the system for providing an audio file based on location information includes first and second mobile devices, such as a first audio player 100 and a second audio player 200. According to an example embodiment of the present invention, an example of sharing the audio file based on a user at a first mobile device (i.e., a first audio player 100) and the other party at a second mobile device (i.e., a second audio player 200) is described; however, the other party can consist of one or more people. In addition, the first and the second mobile devices are described in the context of audio players 100 and 200 which are portable audio file players, commonly referred to as MP3 players, as shown in FIG. 1; however, such mobile devices can also be mobile phones, personal digital assistants (PDAs), and other portable devices for wireless communication.

The first audio player 100 transmits a message requesting location information to the second audio player 200 and sends a short text message (SMS) requesting sharing of an audio file in order to check the location information of the other party who uses the second audio player 200, and shares the audio file. In addition, the first audio player 100 receives the audio file played in the second audio player 200, via wireless communication, and plays the corresponding audio file when the second audio player 200 is located within certain range (e.g., within a short distance) based on the location information of the second audio player 200.

A detailed operation of the first audio player 100 with reference to FIG. 2 will be described as follows. First, in response to a request from the first audio player 100, the second audio player 200 transmits a response message about the location information and share of the audio file. Further, if the first audio player 100 requests the audio file, via wireless communication, the second audio player 200 transmits the currently played audio file. Hereinafter, a more detailed operation of the second audio player 200 is described with reference to FIG. 3 herein below.

Figure 2:
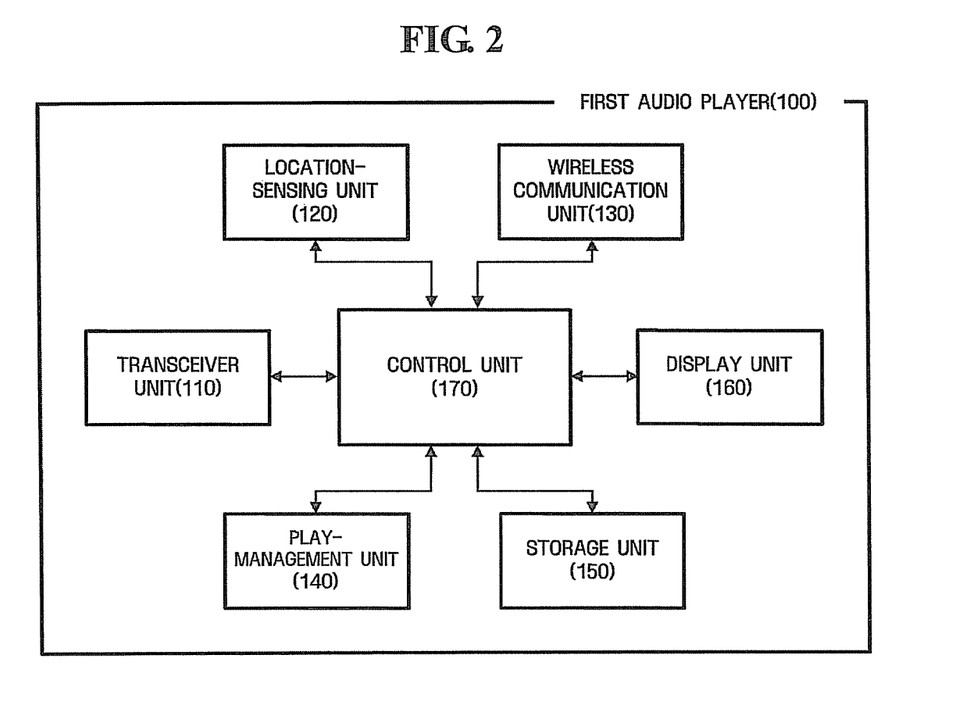
FIG. 2 illustrates a block diagram of an example mobile device for playing an audio file based on received location information according to an example embodiment of the present invention.

FIG. 2 illustrates a block diagram of an example mobile device for playing an audio file based on received location information according to an embodiment of the present invention. As illustrated in FIG. 2, the mobile device corresponds to a first audio player 100 which includes a transceiver unit 110, a location-sensing unit 120, a wireless communication unit 130, a play-management unit 140, a storage unit 150, a display unit 160, and a control unit 170.

The transceiver unit 110 transmits a message for requesting the location information to a second mobile device, i.e., a second audio player 200, and receives a response message about the location information transmitted from the second audio player 200. Here, the transceiver unit 110 can request the location information from the second mobile device, i.e., a second audio player 200 at a predetermined time interval, such as, for example, every hour.

Further, the transceiver unit 110 transmits a short text message (SMS) for requesting share of the audio file to the second audio player 200, and receives a response message about the share of the audio file transmitted from the second audio player 200.

The location-sensing unit 120 senses a relative location between the user who uses the first audio player 100 and the other party who uses the second audio player 200, based on the location information from the second audio player 200. Here, the setting of the distance (i.e., short distance or long distance) between the location-sensing unit 120 and the second audio player 200 can be realized by the control unit 170 and the user, and the location information can be determined at the location-sensing unit 120, via a global positioning system (GPS).

In addition, the location-sensing unit 120 senses the moving direction of the second audio player 200 based on the received location information. For example, the location-sensing unit 120 determines as long distance if the distance difference between the first audio player 100 and the second audio player 200 is more than a certain distance, for example, 100 meters (M), and determines as short distance if the distance difference between the first audio player 100 and the second audio player 200 is less than a certain distance, for example, 50 M.

The wireless communication unit 130 receives the audio file transmitted from the second audio player 200. Here, as a result of the sensing from the location-sensing unit 120, the audio file can be transmitted from the second audio player 200, only when the second audio player 200 is located within a certain range (i.e., when the second audio player 200 is located within a short distance). The wireless communication can be part of a wireless network, and can utilize wireless fidelity (WiFi), ultra-wide band (UWB), near field communication (NFC), Bluetooth, or infrared communication to establish communication between mobile devices, i.e., the first audio player 100 and the second audio player 200.

The play-management unit 140 plays a predetermined sound or audio files based on the location of the second audio player 200. Here, the sound can be diversely provided by the user. Further, the play-management unit 140 can perform 4-step operations for playing the audio file based on the distance between the user and the other party (see the table shown in FIG. 4). For example, if the second audio player 200 is located outside of a short distance as a result of the sensing from the location-sensing unit 120, the play-management unit 140 plays a predetermined audio (i.e., operation of the first step, shown in FIG. 4).

If the second audio player 200 is located within a short distance as a result of the sensing from the location-sensing unit 120, the play-management unit 140 plays the audio file (i.e., the audio file played in the second audio player 200) transmitted from the second audio player 200, via a network, and received at the wireless communication unit 130. Here, when the received audio file is played, the sound from the audio file currently played in the first audio player 100 becomes lower or slowly ends (i.e., operation of the second step, shown in FIG. 4).

Figure 4:
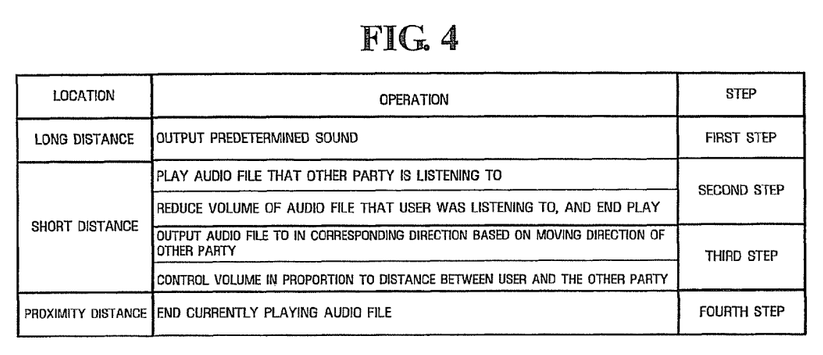
FIG. 4 is a table showing an audio file operation executed by a play-management unit provided in an apparatus for playing an audio file based on received location information according to an example embodiment of the present invention.

The play-management unit 140 can control the output direction of the audio file based on the moving direction of the second audio player 200 sensed by the location-sensing unit 120, and can also control the volume of the audio file played in proportion to the distance between the user who uses the first audio player 100 and the other party who uses the second audio player 200 (i.e., operation of the third step, shown in FIG. 4).

That is, when the second audio player 200 sensed by the location-sensing unit 120 moves to the right of the user (i.e., when the other party at the second audio player 200 moves to the right of the user), the play-management unit 140 can adjust the corresponding audio file to be output from a certain location, such as the right side of a user's headphone. Also, as the distance difference between the user (at the first audio player 100) and the other party (at the second audio player 200) decreases, the volume of the output audio file increases.

Further, if the other party (at the second audio player 200) is located within a certain distance (e.g., the distance where the other party can be seen) from the user, the play-management unit 140 terminates playing of the audio file (i.e., operation of the fourth step, shown in FIG. 4). Here, the first and the fourth steps operated by the play-management unit 140 can be provided depending on the optional setting of the user. The second and the third steps can be performed simultaneously.

The storage unit 150 stores the audio file transmitted from a predetermined audio file and the second audio player 200. In addition, the storage unit 150 stores information on the other party (at the second audio player 200) who will share the audio file with (e.g., user ID), and the SMS for requesting share of the audio file to the other party.

Further, the storage unit 150 stores the first and the fourth steps operated when the play-management unit 140 plays the audio file.

The display unit 160 displays the information on the other party (at the second audio player 200) stored in the storage unit 150 as requested by the user, and the response message on the share of the audio file transmitted from the second audio player 200. In addition, the display unit 160 displays information on the played audio file (e.g., a title, a song title, an artist, and others).

The control unit 170 transmits the SMS for requesting share of the audio file and the message for requesting the location information to the designated mobile device (e.g., the second audio player 200), via the transceiver unit 110. In addition, the control unit 170 transmits a message for requesting the audio file if the second audio player 200 is located within a short distance. Further, the control unit 170 also controls each functional block 110 to 160 included in the first audio player 100.

The term "unit", as used herein, means, but is not limited to, a software or hardware component, such as a Field Programmable Gate Array (FPGA) or an Application Specific Integrated Circuit (ASIC), which performs certain tasks. A unit may advantageously be configured to reside on the addressable storage medium and to execute on one or more processors. Thus, a "unit" may include, by way of example, components, such as software components, object-oriented software components, class components and task components, process, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Figure 3:
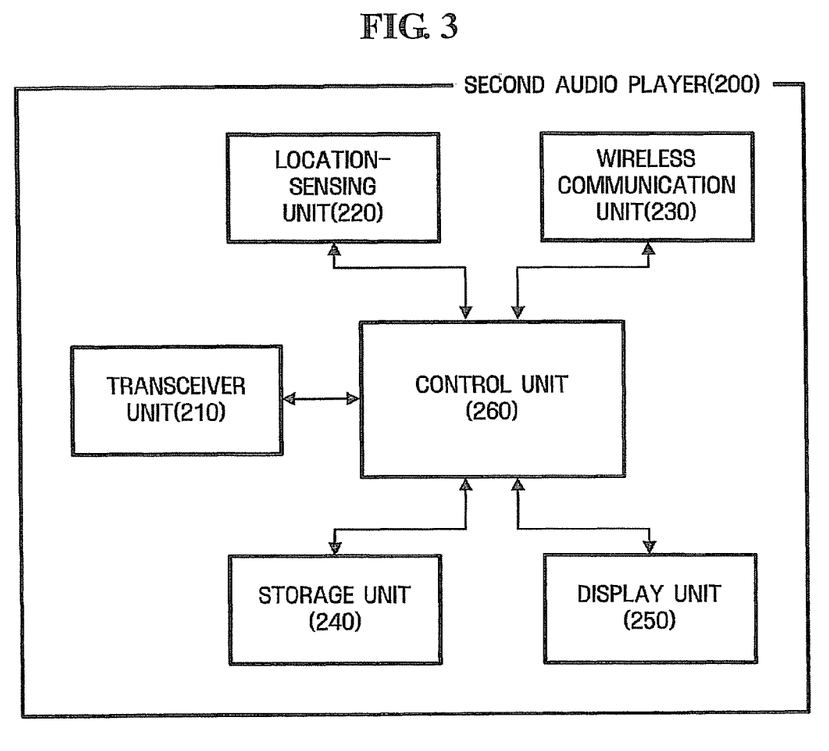
FIG. 3 illustrates a block diagram of another example mobile device for playing an audio file based on received location information according to an example embodiment of the present invention.

Turning now to FIG. 3, a block diagram of a second mobile device for playing an audio file based on received location information according to an example embodiment of the present invention. As shown in FIG. 3, the second mobile device, such as a second audio player 200, includes a transceiver unit 210, a location-sensing unit 220, a wireless communication unit 230, a storage unit 240, a display unit 250, and a control unit 260.

The transceiver unit 210 receives a message for requesting location information from the first audio player 100, and transmits the corresponding location information. In addition, the transceiver unit 210 receives the SMS message for requesting share of the audio file from the first audio player 100, and transmits the corresponding message in response to the share of the audio file.

The location-sensing unit 220 senses its location (i.e., the second audio player 200) based on the location information provided from the global positioning system (GPS).

The wireless communication unit 230 transmits the currently played audio file, when the audio file is requested from the first audio player 100.

The storage unit 240 stores predetermined audio files and audio information.

The display unit 250 displays a message for requesting share of the audio file transmitted from the first audio player 100. In addition, the display unit 250 provides information on the played audio file (e.g., a title, an album, an artist, etc.).

The control unit 260 transmits the location information and the message in response to the share of the audio file, to the first audio player 100, via the transceiver unit 210. In addition, the control unit 260 also controls the operations of each functional block 210 to 250 included in the second audio player 200.

Figure 5:
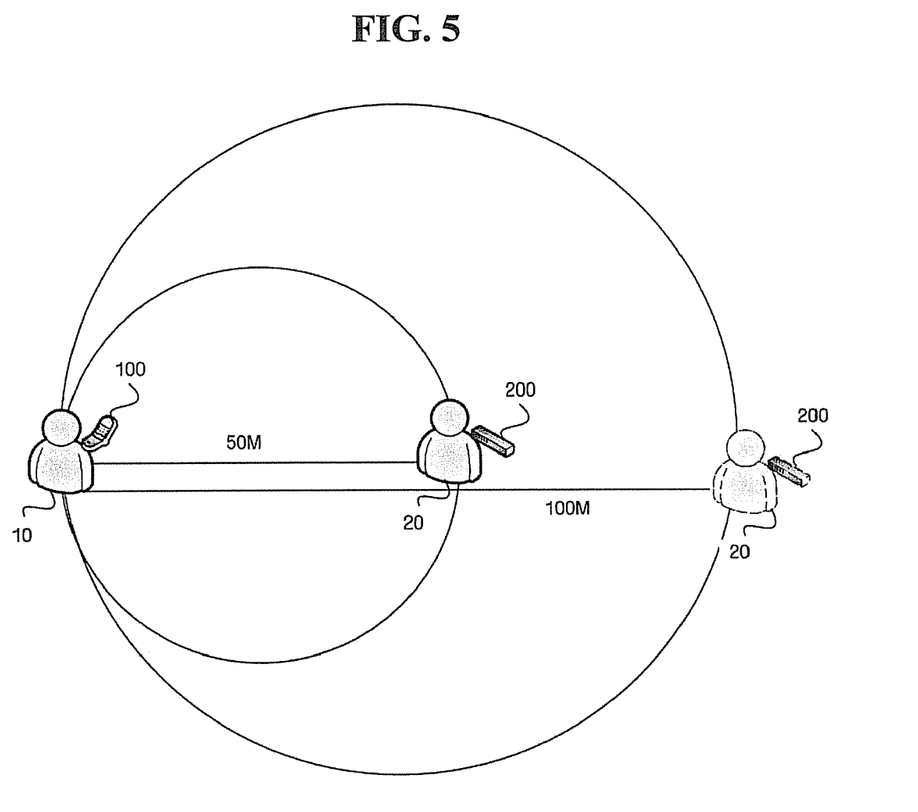
FIG. 5 illustrates example playing a predetermined audio file based on a distance between a first mobile device (i.e., a first audio player) and a second mobile device (i.e., a second audio player) according to an example embodiment of the present invention.

FIG. 5 illustrates example playing a predetermined audio file based on the distance between a first audio player and a second audio player according to an embodiment of the present invention. Here, it is assumed that a user 10 uses the first audio player 100, and the other party 20 uses the second audio player 200. In addition, the user 10 and the other party 20 agree to sharing the audio file.

As illustrated in FIG. 5, the transceiver unit 110 of the first audio player 100 requests location information from the second audio player 200, and the second audio player 200 transmits its location information to the first audio player 100, via the transceiver unit 210.

The location-sensing unit 120 in the first audio player 100, senses the distance difference between the user 10 (at the first audio player 100) and the other party 20 (at the second audio player 200), using the location information from the transmitted second audio player 200.

As a result of the sensing, if the other party 20 using the second audio player 200 is located at a long distance (e.g., 100 M), the play-management unit 140 of the first audio player 100 informs the user 10 that the other party 20 (at the second audio player 200) is located at a long distance away by playing a predetermined sound.

Thereafter, when the other party 20 using the second audio player 200 is located within a short distance (e.g., 50 M) after the location-sensing unit 120 senses the distance difference between the user 10 (at the first audio player 100) and the other party 20 (at the second audio player 200, the wireless communication unit 130 of the first audio player 100 requests the currently played audio file the second audio player 200.

Then, the wireless communication unit 230 of the second audio player 200 transmits the currently played audio file (e.g., a music B) to the first audio player 100.

Next, the play-management unit 140 plays the audio file transmitted from the second audio player 200, and informs the user that the other party 20 (at the second audio player 200) is located within a short distance. Here, if the received audio file (e.g., a song B) is played in the first audio player 100, the volume of an audio file (e.g., a song A) played in the first audio player 100 becomes lower or slowly ends. In addition, the audio file (e.g., a song B) can be output in the direction identical to the moving direction of the other party 20 (e.g., the right side).

Figure 6:
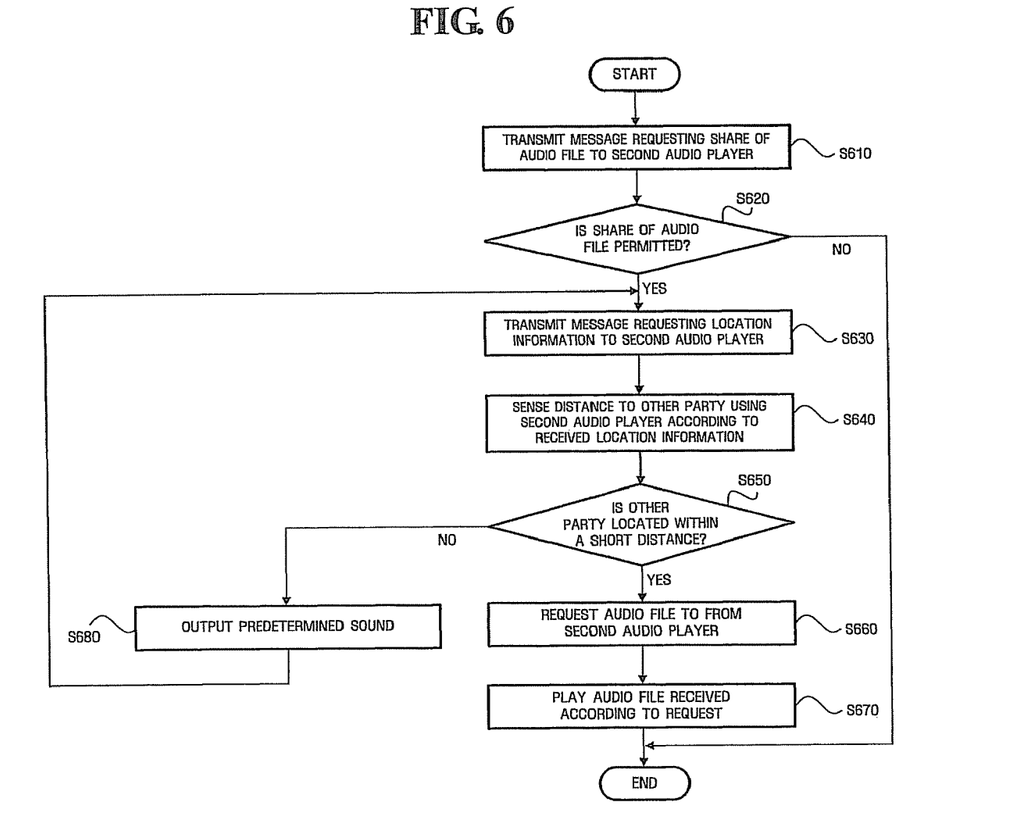
FIG. 6 is a flowchart illustrating a method of playing an audio file based on received location information according to an embodiment of the present invention.

FIG. 6 is a flowchart illustrating a method of playing an audio file based on the received location information according to an embodiment of the present invention.

First, the first audio player 100 selects the other party 20 (at the second audio player 200) to share the audio file based on the information on the other party stored in the storage unit 150. Next, the control unit 170 of the first audio player 100 transmits a message for requesting share of the audio file to the second audio player 200 of the other party 20 selected by the transceiver unit 110 at block S610.

Next, the control unit 170 of the first audio player 100 determines if the share of audio file is permitted at block S620. This is based on when a message permitting the share of the audio file is transmitted from the second audio player 200. The control unit 170 then transmits a message for requesting the location information to the second audio player 200, via the transceiver unit 110 at block S630.

Meanwhile, if the message not permitting the share of the audio file is transmitted from the second audio player 200 at block S620, a process of informing the other party's location information by playing the audio file is completed.

However, when the location information is transmitted from the second audio player 200, the location-sensing unit 120 of the first audio player 100 senses the location of the user 10 who uses the first audio player 100 and that of the other party 20 who uses the second audio player 200 based on the location information transmitted from the second audio player 200 at block S640. Here, the location-sensing unit 120 senses the moving direction of the second audio player 200 based on the received location information.

The location-sensing unit 120 also determines if the other party 20 at the second audio player 200 is located within a short distance as a result of the sensing at block S650. If the other party 20 at the second audio player 200 is not within a short distance, the play-management unit 140 of the first audio player 100 outputs a predetermined sound at block S680. Therefore, the user 10 who uses the first audio player 100 can sense that the other party 20 at the second audio player 200 is located within a short or a long distance.

Meanwhile, if the other party 20 at the second audio player 200 is located within a short distance as a result of the sensing at block S650, the control unit 170 requests the currently played audio file from the second audio player 200 at block S660.

Next, the wireless communication unit 130 receives the audio file transmitted from the second audio player 200, and the play-management unit 140 plays the received audio file at block S670. Here, if the received audio file (e.g., the song B) is played in the first audio player 100, the volume of the audio file (e.g., a song A) played in the first audio player 100 becomes lower or slowly terminates. In addition, the audio file (e.g., a song B) can be output from the direction identical to the moving direction of the other party user 20 (e.g., the right side).

Therefore, the user 10 who uses the first audio player 100 can notice that the other party 20 at the second audio player 200 is located within a short or long distance and that the user is coming from the right side. Here, when the other party 20 is located within a certain distance (e.g., the distance where the other party user can be seen), the play-management unit 140 terminates playing of the current audio file.

As described above, the method and apparatus for playing an audio file according to the received location information provide information on the location and the direction of a user and the other party user within a certain distance through an audio player, and the user's music taste.

Various components of the first audio player 100, as shown in FIG. 1, and the second audio player 200, as shown in FIG. 2, such as the location sensing unit and the wireless communication unit can be integrated into a single control unit, or alternatively, can be implemented in software or hardware, such as, for example, a field programmable gate array (FPGA) and an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

In addition, the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A mobile device for playing an audio file based on received location information, the mobile device comprising:
a transceiver unit configured to receive a response message about a sharing of the audio file and location information transmitted from a designated mobile device, via wireless communication;
a location-sensing unit configured to determine a relative location of the designated mobile device based on the received location information;
a wireless communication unit arranged to receive the audio file transmitted from the designated mobile device; and
a play-management unit configured to play the received audio file if the determined relative location of the designated mobile device is within a predetermined distance.

2. The mobile device as claimed in claim 1, wherein the location-sensing unit is configured to sense a moving direction of the designated mobile device based on the received location information.

3. The mobile device as claimed in claim 1, wherein the play-management unit is configured to control a volume of an audio file currently being played, when the received audio file is played.

4. The mobile device as claimed in claim 1, wherein the play-management unit is configured to output the played audio file based on the moving direction of the designated mobile device.

5. The mobile device as claimed in claim 1, wherein the play-management unit is configured to control a volume of the played audio file based on the determined relative location of the designated mobile device.

6. The mobile device as claimed in claim 1, wherein the play-management unit is configured to play a predetermined audio, if the determined relative location of the designated mobile device is outside the predetermined distance.

7. The mobile device as claimed in claim 1, wherein the play-management unit is configured to terminate a playing of the audio file, if the determined relative location of the designated mobile device is within a certain distance that is less than the predetermined distance.

8. A mobile device for playing an audio file according to received location information, the mobile device comprising:
a transceiver unit configured to receive a message requesting a sharing of an audio file and location information transmitted from a designated mobile device, via wireless communication;
a location-sensing unit configured to determine a relative location of the designated mobile device according to the received message for requesting the location information;
a wireless communication unit configured to transmit the audio file according to the received message requesting the sharing of the audio file from the designated mobile device; and
a play-management unit configured to play the transmitted audio file if the determined relative location of the designated mobile device is within a predetermined distance.

9. A method of playing an audio file between a first audio player and a second audio player according to received location information, the method comprising:
transmitting, at the first audio player, a message requesting a sharing of the audio file and a message requesting location information to the second audio player;
sensing, at the first audio player, a relative location of the first audio player and the second audio player based on the received location information, the received location information being location information received in response to the message requesting location information;
receiving, at the first audio player, the audio file from the second audio player in response to the message requesting the sharing of the audio file, if the sensed relative location is within a predetermined distance; and
playing the received audio file.

10. The method as claimed in claim 9, further comprising:
sensing a moving direction of the second audio player based on the received location information.

11. The method as claimed in claim 9, wherein a volume of an audio file currently being played in the first audio player is controlled when the received audio file is played in the first audio player.

12. The method as claimed in claim 9, wherein the received audio file is played based on a moving direction of the second audio player.

13. The method as claimed in claim 9, wherein a volume of the played audio file is controlled based on the sensed relative location.

14. The method as claimed in claim 9, wherein a predetermined sound is played when the sensed relative location is outside the predetermined distance.

15. The method as claimed in claim 9, wherein the playing of the received audio file is terminated when the sensed relative location is within a certain distance that is less than the predetermined distance.

16. A system for sharing an audio file, comprising:
a first mobile device; and
a second mobile device configured to play the audio file, and connect with the first mobile device, via wireless communication,
wherein the first mobile device is configured to:
transmit a message requesting location information of the second mobile device, to the second mobile device;
receive a response from the second mobile device indicating the location information of the second mobile device;
determine whether the second mobile device is located within a certain distance based on the location information; and
when the second mobile device is located within the certain distance, transmit a message requesting an audio file that is currently being played at the second mobile device, receive the audio file that is currently being played at the second mobile device, and play the audio file received from the second mobile device.

17. The system as claimed in claim 16, wherein the first mobile device and the second mobile device correspond to audio players.

18. The system as claimed in claim 16, wherein the first mobile device is further configured to transmit a message to the second mobile device requesting a sharing of the audio file that is currently being played at the second mobile device, and, only when the sharing of the audio file that is currently being played at the second mobile device is permitted by the second mobile device, transmit the message requesting location information of the second mobile device.

19. The system as claimed in claim 16, wherein, when the second mobile device is not located within the certain distance, the first mobile device is configured to generate a predetermined audio.

20. The system as claimed in claim 18, wherein the first mobile device comprises:
- a transceiver unit arranged to transmit the message requesting location information of the second mobile device, receive the response from the second mobile device indicating the location information of the second mobile device, transmit the message to the second mobile device requesting the sharing of the audio file that is currently being played at the second mobile device, and receive a response from the second mobile device regarding the sharing of the audio file that is currently being played at the second mobile device, via wireless communication;
- a location-sensing unit arranged to determine a relative location of the second mobile device based on the location information;
- a wireless communication unit arranged to receive from the second mobile device the audio file that is currently being played at the second mobile device; and
- a play-management unit arranged to play the received audio file when the second mobile device is located within the certain distance based on the location information.

21. The system as claimed in claim 20, wherein the location-sensing unit is configured to sense a moving direction of the second mobile device based on the location information.

22. The system as claimed in claim 20, wherein the play-management unit is configured to control a volume of an audio file currently being played, when the received audio file is played at the first mobile device.

23. The system as claimed in claim 21, wherein the play-management unit is configured to output the received audio file based on the sensed moving direction of the second mobile device.

24. The system as claimed in claim 21, wherein the play-management unit is configured to control a volume of the received audio file based on the determined relative location of the second mobile device.

25. The system as claimed in claim 21, wherein the play-management unit is configured to output a predetermined audio, if the second mobile device is located outside the certain distance.

26. The system as claimed in claim 21, wherein the play-management unit is configured to terminate the playing of the received audio file, if the second mobile device is located within a distance that is less than the certain distance.

27. The system as claimed in claim 18, wherein the second mobile device comprises:
- a transceiver unit arranged to receive the message requesting the sharing of the audio file that is currently being played at the second mobile device and the message requesting location information transmitted from the first mobile device, and transmit the corresponding location information, via wireless communication;
- a location-sensing unit arranged to determine the corresponding location information based on location information provided from a global positioning system (GPS); and
- a wireless communication unit arranged to transmit the audio file that is currently being played at the second mobile device to the first mobile device upon receipt of the message requesting the sharing of the audio file that is currently being played at the second mobile device from the first mobile device.

* * * * *